United States Patent
Seo et al.

(10) Patent No.: US 12,481,603 B2
(45) Date of Patent: Nov. 25, 2025

(54) SYSTEMS OF SEMICONDUCTOR DEVICES AND OPERATING METHODS THEREOF

(71) Applicant: SK hynix Inc., Icheon-si (KR)

(72) Inventors: Sung Min Seo, Icheon-si (KR); Woon Yong Jo, Icheon-si (KR); Kyung Lan Heo, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 12 days.

(21) Appl. No.: 18/668,040

(22) Filed: May 17, 2024

(65) Prior Publication Data

US 2025/0173279 A1     May 29, 2025

(30) Foreign Application Priority Data

Nov. 29, 2023   (KR) .......................... 10-2023-0169769

(51) Int. Cl.
     *G06F 13/12*      (2006.01)
(52) U.S. Cl.
     CPC .................. *G06F 13/122* (2013.01)
(58) Field of Classification Search
     CPC .................................................... G06F 13/122
     See application file for complete search history.

(56) References Cited

U.S. PATENT DOCUMENTS 7,506,110 B2    3/2009   Neils et al.
2014/0149800 A1*   5/2014   Nishimaki ............ G06F 11/263
                                                714/40

FOREIGN PATENT DOCUMENTS

CN      114390116 A   *   4/2022 ............. H04L 63/20
EP       3544860 B1   *   5/2021 ....... H04L 12/40104
KR    20210108466 A      9/2021

OTHER PUBLICATIONS

Translation of CN-114390116-A (Year: 2022).*

* cited by examiner

*Primary Examiner* — Henry Tsai
*Assistant Examiner* — John B Roche
(74) *Attorney, Agent, or Firm* — Perkins Coie LLP

(57) ABSTRACT

A system includes a peripheral circuit comprising at least one I/O (input and output) device; a memory device configured to store digital information including at least one set of control programs, each set comprising a plurality of sequences; and a processor in communication with the peripheral circuit and the memory device and configured to control at least one of the peripheral circuit or the memory device by processing a control program according to a processing order of sequences of the control program. The processor is in communication with an external device and configured to change the processing order of the sequences in response to receiving of a request from the external device.

19 Claims, 5 Drawing Sheets

SYSTEMS OF SEMICONDUCTOR DEVICES AND OPERATING METHODS THEREOF

PRIORITY CLAIM AND CROSS-REFERENCES TO RELATED APPLICATION

This patent document claims the priority and benefits of Korean Patent Application No. 10-2023-0169769, filed on Nov. 29, 2023, in the Korean Intellectual Property Office, which is incorporated herein by reference in its entirety.

TECHNICAL FIELD

Various embodiments of the disclosed technology relate to a semiconductor technology, and particularly, to a system of semiconductor devices and an operating method thereof.

BACKGROUND

A semiconductor device may be operated as hardware including a digital circuit and an analog circuit executes given software.

A semiconductor chip that is synthesized hardware-wise and manufactured operates according to determined standards.

If an operation of the manufactured semiconductor chip needs to be modified because performance of the semiconductor chip is different from expected performance thereof, the operation may be modified through a functional workaround method, but it is difficult to solve a fundamental problem of the semiconductor chip.

SUMMARY

In an embodiment, a system may include a peripheral circuit comprising at least one I/O (input and output) device; a memory device configured to store digital information including at least one set of control programs, each set comprising a plurality of sequences; and a processor in communication with the peripheral circuit and the memory device and configured to control at least one of the peripheral circuit or the memory device by processing a control program according to a processing order of sequences of the control program. The processor is in communication with an external device and configured to change the processing order of the sequences in response to receiving of a request from the external device.

In an embodiment, there is provided an operating method of a system including a processor in communication with a peripheral circuit and a memory device. The operating method comprises: receiving, by the processor, a request to change a processing order of sequences of a control program from an external device; changing, by the processor, the processing order of the sequences; and executing, by the processor, the control program to control at least one of the peripheral circuit or the memory device according to a changed processing order of the sequences.

In an embodiment, a system may include a memory device configured to store at least one set of control programs, each control program comprising sequences; and a processor electrically connected to a peripheral circuit and configured to control the peripheral circuit by executing the control program. The processor is configured to change an operation order of the peripheral circuit by controlling the sequences in response to receiving a request from an external device.

According to some implementation of the disclosed technology, a function of hardware can be changed by control of a program sequence.

Accordingly, even after a semiconductor device is manufactured, a change in the function of the semiconductor device and a workaround method for the semiconductor device can be flexibly processed.

DETAILED DESCRIPTION

Hereinafter, embodiments of the present technology will be described in detail with reference to the accompanying drawings.

In various applications, in order to change a function of a semiconductor chip, the hardware of the semiconductor chip may be changed. This need for hardware changes may increase manufacturing costs of semiconductor chips and various systems that include semiconductor chips. Some implementations of the disclosed technology provide a system with semiconductor devices and manufacturing method, which enable to control a function of the system and the semiconductor device more flexibly.

Figure 1:
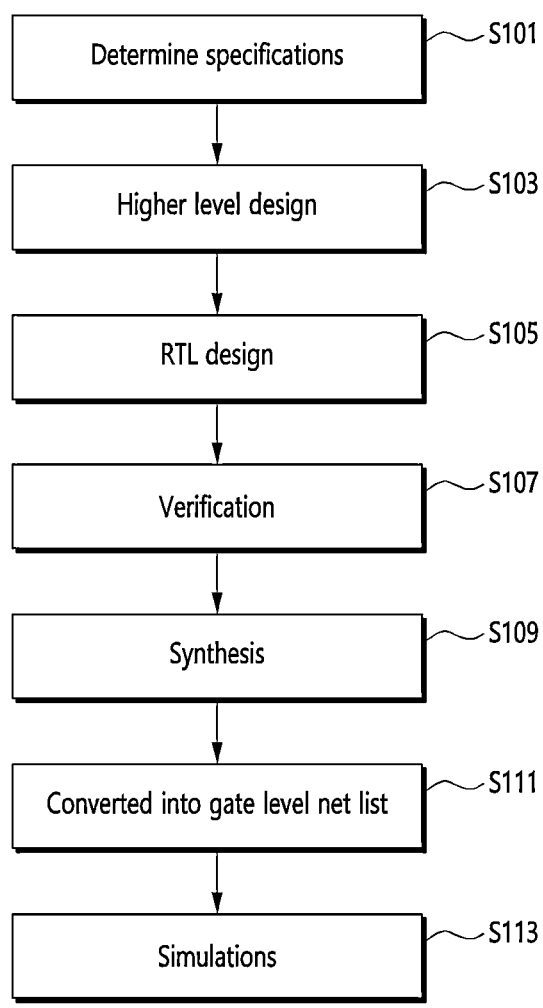
FIG. 1 is a flowchart for describing a method of designing and manufacturing a semiconductor device according to an embodiment of the disclosed technology.

FIG. 1 is a flowchart for describing a method of designing and manufacturing a semiconductor device according to an embodiment.

At operation S101, the specifications for the semiconductor device are determined in order to manufacture a semiconductor device which can be a memory chip, a processor or a component of a circuit or circuit module. For example, the specifications relate to operations and/or performances of the semiconductor device to be manufactured. For example, at operation S101, what kind of operations are performed by the semiconductor device and desired performance of the semiconductor device may be determined.

When the specifications are determined, a higher level design of the semiconductor device may be performed (S103). The higher level design may mean or include describing a target semiconductor device in a higher language of a computer language. For example, a higher language, such as a C language, may be used.

Circuits that are designed by the higher level design may be designed in a register transfer level (RTL) by using a hardware description language (HDL) (S105).

After the RTL design, whether the design has been correctly performed may be verified (S107).

A verified RTL code may be logically synthesized (S109), and may be converted into a gate level net list (S111).

Thereafter, the simulation for the gate level net list is performed to check an operating speed and the time for the semiconductor device (S113).

The semiconductor device manufactured as described above may operate according to determined design specifications after the semiconductor device is synthesized.

When the manufactured semiconductor device is manufactured and activated, a functional workaround procedure for modifying a function of the semiconductor device, which does not reach expected performance, may be performed. In some implementations, the functional workaround procedure may be required to modify the operation to be different from that according to the determined design specifications. Such functional workaround procedure may need to be flexibly handled.

Figure 2:
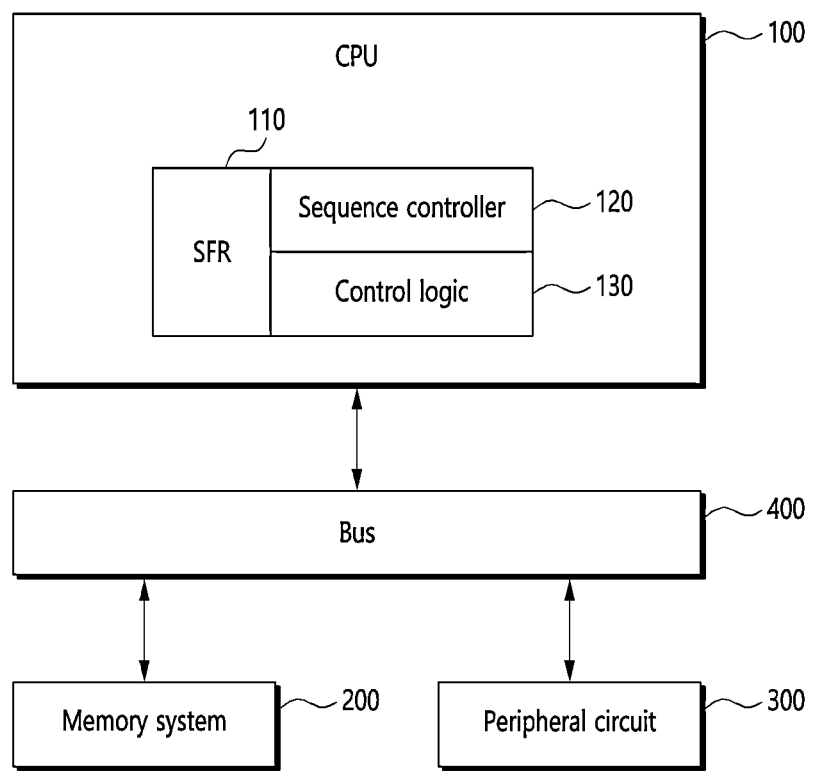
FIG. 2 is a construction diagram of a system of semiconductor devices according to an embodiment of the disclosed technology.

FIG. 2 is a construction diagram of a system that incudes semiconductor devices according to an embodiment of the disclosed technology.

Referring to FIG. 2, a system 10 according to an embodiment may include various semiconductor devices, including, for example, a central processing unit (CPU) 100, a memory system 200, a peripheral circuit 300, and a bus 400. The CPU 100, the memory system 200, the peripheral circuit 300, and the bus 400 may correspond to hardware components and electrically connected to one another.

The CPU 100 may perform an operation that is necessary for the driving of the system 10. In an embodiment, the CPU 100 may include a plurality of cores.

The memory system 200 may include a volatile memory device and a nonvolatile memory device. The memory system 200 may be connected to the system 10, and may provide an environment that is necessary for a high-speed operation. At least one set of control program codes that are necessary for the CPU 100 to operate the system 10 may be stored in the nonvolatile memory device of the memory system 200.

The peripheral circuit 300 may provide an environment that is necessary for the system 10 to access an external device. The peripheral circuit 300 may include at least one I/O (input/output) device. In some implementations, the peripheral circuit 300 may support various interface protocols which enable the system 10 and the external device to be compatible with each other. In an embodiment, an arbitrary number of interface protocols may be selected among a mobile industry processor interface (MIPI), a high-definition multimedia interface (HDMI), DisplayPort (DP), a serializer/deserializer (SERDES), Ethernet, peripheral component interconnect express (PCIe), a compute express link (CXL), a die-to-die (D2D), and/or universal chiplet interconnect express (UCIe).

The bus 400 may be a signal exchange passage among the CPU 100, the memory system 200, and the peripheral circuit 300. For example, an advanced high-performance bus (AHB) or a multi-layer advanced extensible interface (AXI) may be used as the bus 400, but an embodiment is not limited thereto.

The system 10 may be denoted as a system on chip (SoC) in which a plurality of semiconductor chips has been integrated in one integrated circuit.

The CPU 100 may be configured to execute a control program code that has been stored in the memory system 200, in order to perform a unique function that has been intended upon design of the system 10. In the implementations, the CPU 100 may control the memory system 200 and the peripheral circuit 300 such that the system 10 performs the desired functions. Each of the memory system 200 and the peripheral circuit 300 may include hardware circuits, such as a digital circuit and an analog circuit. The CPU 100 may operate the hardware circuit by processing the control program.

In an embodiment, the CPU 100 may control analog circuits, such as a power supply circuit, an initialization circuit, and a clock synchronization circuit that are included in the peripheral circuit 300, by executing a program for driving an interface device that is included in the peripheral circuit 300, e.g., SERSES.

After the system 10 is synthesized, in order to dynamically operate a hardware circuit, the CPU 100 may include a special function register (SFR) 110, a sequence controller 120, and control logic 130.

The SFR 110 may store data that is necessary for at least one of an operation control and setting, an input and output control, a timer setting, an interrupt management, or an state check of internal logic of the CPU 100. The SFR 110 may be controlled by the CPU 100 at a predetermined time, e.g., when an initialization process and active process of the system 10 are performed. In an embodiment, the SFR 110 may include a sequence counter for storing the processing order of sequences of a program to be executed by the control logic 130 and the address of a sequence code that is currently executed by the control logic 130.

The sequence controller 120 may extract the sequence code of a program to be processed by the control logic 130 based on the processing order of sequences that has been set in the SFR 110 and the sequence counter, and may provide the extracted sequence code to the control logic 130.

The control logic 130 may output a control signal set for controlling the peripheral circuit 300 by processing a sequence code that is provided by the sequence controller 120.

In some implementations, a control program that is processed by the CPU 100 includes a plurality of sequences. The processing order of sequences and a sequence counter for each program may be stored in the SFR 110 and can be changed by the SFR 110.

Accordingly, an output order of a control signal set for controlling a hardware circuit may be changed by changing the processing order of sequences of the SFR 110.

If the control signal set needs to be modified, a control program code stored in the memory system 200 may be changed.

A change in the processing order of sequences or program codes may be performed through an external device that is manipulated by various entities, e.g., a designer, a manufacturer, or a user of the system 10. The peripheral circuit 300 may provide an interface environment with the external device for such a change.

Figure 3:
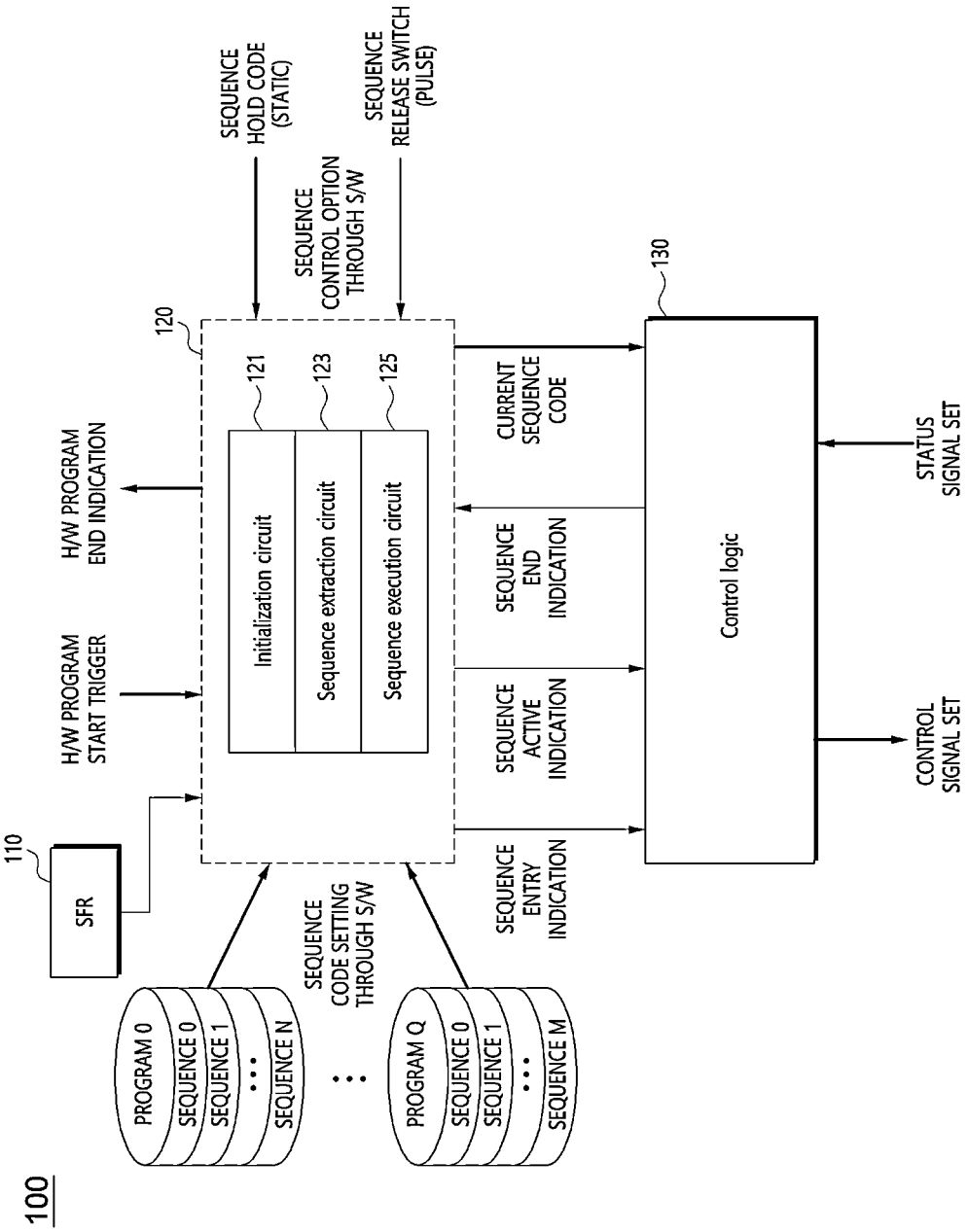
FIG. 3 is a construction diagram of a central processing unit (CPU) according to an embodiment of the disclosed technology.

FIG. 3 is a construction diagram of the CPU according to an embodiment of the disclosed technology.

In the implementation as shown in FIG. 3, the CPU 100 may include the SFR 110, the sequence controller 120, and the control logic 130. The sequence controller 120 may include an initialization circuit 121, a sequence extraction circuit 123, and a sequence execution circuit 125.

The processing order of sequences that has been set upon manufacturing of the system 10 or that is changed by an external device may be stored in the SFR 110.

The initialization circuit 121 may initialize a sequence counter that has been stored in the SFR 110 in response to a control program processing request signal (H/W Program Start Trigger).

The sequence extraction circuit 123 may obtain a sequence code corresponding to the sequence counter of the SFR 110 from the memory system 200 (Sequence Code Setting through S/W).

A program code for each control program may be stored in the memory system 200. Referring to FIG. 3, the control programs, PROGRAM 0 to PROGRAM Q, are shown, each control program including a corresponding set of sequence codes.

Figure 4:
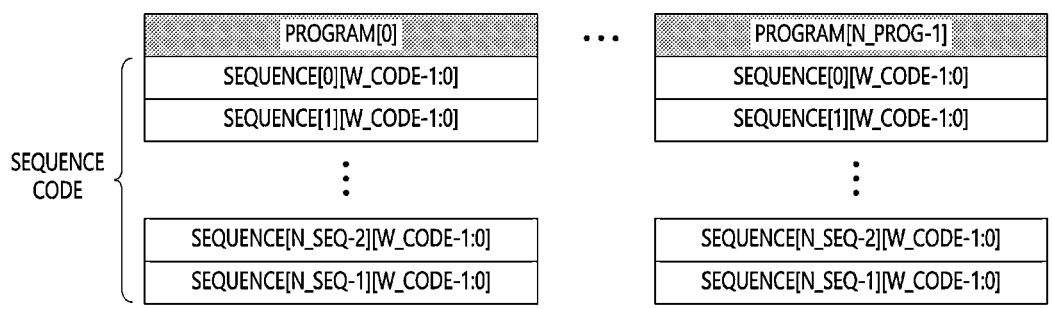
FIG. 4 is a diagram for describing a sequence code according to an embodiment of the disclosed technology.

FIG. 4 is a diagram for describing a sequence code according to an embodiment of the disclosed technology.

Referring to FIG. 4, a control program 0, Program[0], and a control program N, Program[N_PROG−1], may include N sequences Sequence[0] to Sequence[N_SEQ−1]. Each of the sequences, Sequence[0] to Sequence[N_SEQ−1], may be described as a corresponding sequence code W_CODE−1:0.

Referring back to FIG. 3, the sequence extraction circuit 123 may notify the control logic 130 that sequence processing has been started. Such notification may be performed by, for example, sending the indication, Sequence Entry Indication. The sequence extraction circuit 123 may extract a sequence code from a location indicated by a sequence counter according to the processing order of sequences that has been stored in the SFR 110. The sequence execution circuit 125 may request the control logic 130 to process the sequence code that has been extracted by the sequence extraction circuit 123. The request for processing the sequence code may be made by, for example, sending Sequence Active Indication, and the sequence code may be provided to the control logic by, for example, providing Current Sequence Code.

The control logic 130 may output a control signal set by executing the sequence code. When the sequence processing is completed, the control logic 130 may notify the sequence controller 120 that the sequence processing has been completed. Such notification is performed by, for example, sending Sequence End Indication.

The peripheral circuit 300 may operate according to the control signal set, and may provide, to the control logic 130, a status signal set indicating the results of the processing of the operation The CPU 100 may further include a verification circuit for verifying a function of the peripheral circuit 300 based on the status signal set.

In response to the notification that the sequence processing has been completed from the control logic 130, the sequence execution circuit 125 may increase the sequence count with reference to the SFR 110, and may transmit the increased sequence count to the sequence extraction circuit 123. The sequence execution circuit 125 may increase the sequence count until a sequence corresponding to the last processing order of a program that is being processed is processed.

The sequence extraction circuit 123 may extract a sequence code corresponding to the increased sequence count, and a subsequent operation may be performed in the same way that has been described above.

When all of sequence codes are executed according to the processing order of sequences stored in the SFR 110 and the processing of the control program is completed, the sequence controller 120 may output a control program processing completion signal (H/W Program End Indication).

A sequence code processing holding request may be made while the sequence codes are executed (Sequence Hold Code). The sequence holding may be requested when it is necessary to check a circuit operation in a corresponding sequence (Sequence Option through SW). In response to the sequence code processing holding request, the sequence processing may be held, and the circuit operation in the corresponding sequence may be checked. When the check of the circuit operation is completed, a subsequent sequence may be continued by releasing the sequence processing holding (Sequence Release Switch). Accordingly, a desired function can be tested by holding a control program in a desired sequence and reading the state of the system 10 or modifying a circuit of the system 10.

Figure 5:
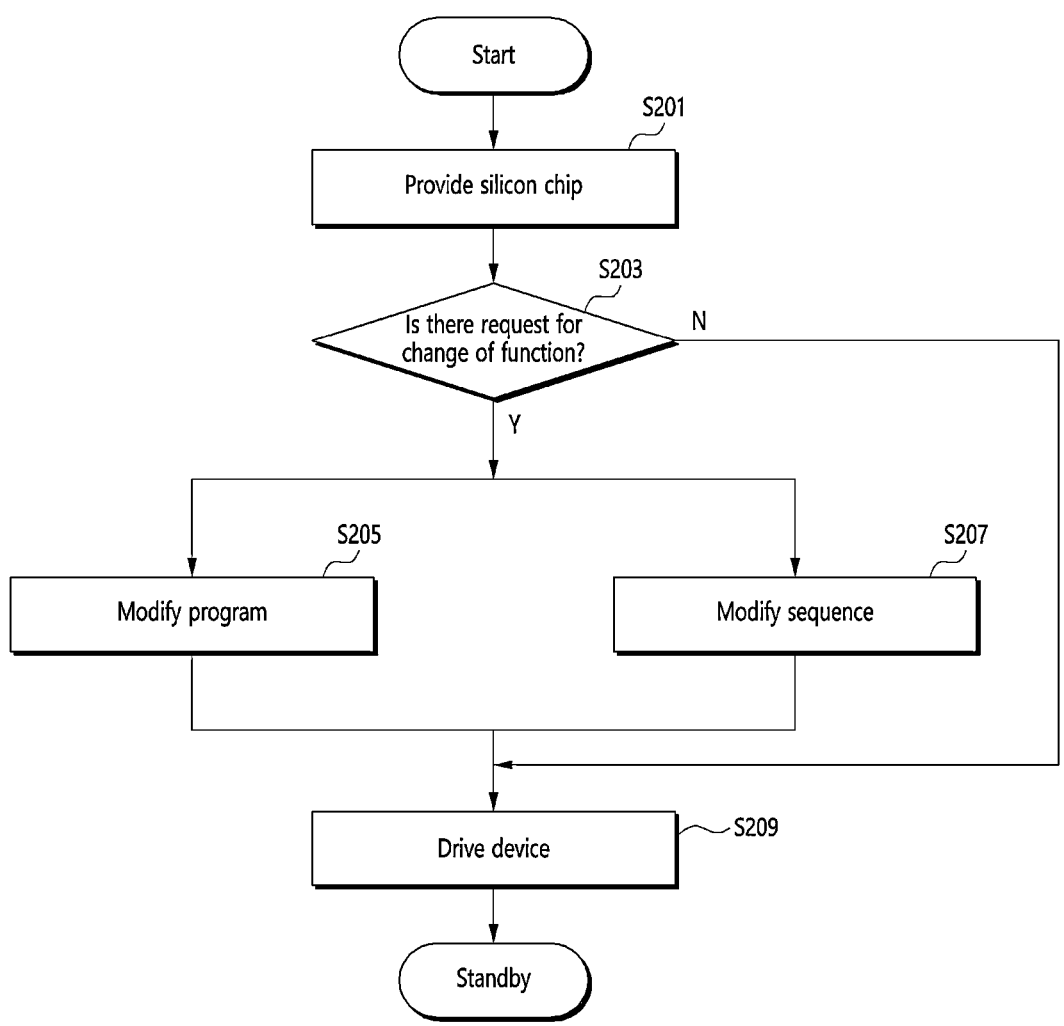
FIG. 5 is a flowchart for describing an operating method of the semiconductor device according to an embodiment of the disclosed technology.

FIG. 5 is a flowchart for describing an operating method of the semiconductor device according to an embodiment of the disclosed technology.

Referring to FIG. 5, a silicon chip whose hardware implementation has been completed may be provided (S201). In the example, the silicon chip may be the system 10 illustrated in FIG. 2. The silicon chip may be manufactured through a manufacturing process including the process illustrated in FIG. 1, for example.

In a process of driving the silicon chip, the CPU 100 may determine whether there is a request to change from an external device (S203). For example, the request may include changing an operation order or changing a function option of the silicon chip. The external device may be a device through which a designer, a manufacturer, or a user of the silicon chip attempts to access the silicon chip.

When a change in the function of the silicon chip is requested (Y in S203) and the modification of a control signal set is requested, the CPU 100 may receive a modified control program from the external device and incorporate the modified control program into the memory system 200 (S205).

When a change in the function of the silicon chip is requested (Y in S203) and the modification of the processing order of a program sequence is requested, the CPU 100 may receive a modified program sequence processing order from the external device and incorporate the modified program sequence processing order into the SFR 110 (S207).

Thereafter, the CPU 100 may drive the silicon chip according to the modified control program or the modified program sequence processing order (S209).

When a request to change the function is not received (N in S203), the CPU 100 may drive the silicon chip according to a control program or program sequence processing order that has been previously set (S209).

Accordingly, after the hardware synthesis of the semiconductor chip is completed, a control sequence of the hardware may be changed through software.

Accordingly, even after the semiconductor device is manufactured, a change of a function or a workaround process can be flexibly processed.

As described above, those skilled in the art to which the present technology pertains may understand that the present technology may be implemented in various other forms. Accordingly, it is to be understood that the aforementioned embodiments are illustrative from all aspects not being limitative.

While various embodiments have been described above, variations and improvements of the disclosed embodiments and other embodiments may be made based on what is described or illustrated in this document.

What is claimed is:

1. A system comprising:
   a peripheral circuit comprising at least one I/O (input and output) device;
   a memory device configured to store digital information including at least one set of control programs, each set comprising a plurality of sequences; and
   a processor in communication with the peripheral circuit and the memory device and configured to control at least one of the peripheral circuit or the memory device by processing a control program according to a processing order of sequences of the control program, wherein the processor is in communication with an external device and configured to change the processing order of the sequences in response to receiving a request from the external device.

2. The system according to claim 1, wherein the processor comprises a register configured to store the processing order of the sequences.

3. The system according to claim 2, wherein the register includes a sequence counter for storing the processing order of sequences of the control program and an address of a sequence code that is currently executed by the processor.

4. The system according to claim 3, wherein the processor further includes an initialization circuit configured to initialize the sequence counter.

5. The system according to claim 1, wherein the processor is configured to change a sequence code of the control program in response to the receiving of the request from the external device.

6. The system according to claim 1, wherein the peripheral circuit and the processor are implemented as hardware and electrically connected to each other.

7. The system according to claim 1, wherein the processor comprises:
    a sequence extraction circuit configured to extract a sequence code of the control program from the memory device based on the processing order of the sequences; and
    a control logic configured to execute the sequence code.

8. The system according to claim 7, wherein the control logic is further configured to provide a control signal for controlling the peripheral circuit based on the sequence code of the control program.

9. The system according to claim 1, wherein the processor further includes a verification circuit for verifying a function of the peripheral circuit.

10. An operating method of a system, wherein the system comprises a processor in communication with a peripheral circuit and a memory device, and
    the operating method comprises:
    receiving, by the processor, a request to change a processing order of sequences of a control program from an external device;
    changing, by the processor, the processing order of the sequences; and
    executing, by the processor, the control program to control at least one of the peripheral circuit or the memory device according to a changed processing order of the sequences.

11. The operating method according to claim 10, wherein the processor is configured to change a code of the control program in response to receiving of the request from the external device.

12. The operating method according to claim 11, further comprising:
    generating a control signal for controlling the peripheral circuit based on the changed processing order of the sequences; and
    providing the control signal to the peripheral circuit.

13. The operating method according to claim 12, further comprising, after the providing of the control signal:
    receiving, from the peripheral circuit, a status signal indicating a result of processing the peripheral circuit.

14. The operating method according to claim 10, further comprising:
    extracting, by the processor, a sequence code from the memory device based on the processing order of the sequences.

15. A system comprising:
    a memory device configured to store at least one set of control programs, each control program comprising sequences; and
    a processor electrically connected to a peripheral circuit and configured to control the peripheral circuit by executing the control program,
    wherein the processor is configured to change an operation order of the peripheral circuit by controlling the sequences in response to receiving a request from an external device.

16. The system according to claim 15, wherein the peripheral circuit is implemented as hardware.

17. The system according to claim 15, wherein the processor comprises a register configured to store a processing order of the sequences.

18. The system according to claim 15, wherein the processor is configured to change a code of the control program in response to receiving of the request from the external device.

19. The system according to claim 15, wherein the processor comprises:
    a sequence extraction circuit configured to extract a sequence code from the memory device based on a processing order of the sequences; and
    a control logic configured to execute an extracted sequence code.

* * * * *